(12) United States Patent
Schenkel et al.

(10) Patent No.: US 6,702,048 B2
(45) Date of Patent: Mar. 9, 2004

(54) SYSTEM AND METHOD FOR CALIBRATING A DIFFERENTIAL STEERING SYSTEM

(75) Inventors: Nathan Todd Schenkel, Brimfield, IL (US); Jeffrey Michael Thate, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 142 days.

(21) Appl. No.: 09/987,586

(22) Filed: Nov. 15, 2001

(65) Prior Publication Data

US 2003/0089547 A1 May 15, 2003

(51) Int. Cl.⁷ ............................................... B62D 11/06
(52) U.S. Cl. ........................................ 180/6.44; 701/41
(58) Field of Search ............................... 180/6.2, 6.44, 180/6.64, 6.66, 6.7, 9.44; 701/41, 42, 43

(56) References Cited

U.S. PATENT DOCUMENTS

| | | | |
|---|---|---|---|
| 5,101,919 A | * 4/1992 | Ossi | 180/6.2 |
| 5,184,297 A | 2/1993 | Graber et al. | |
| 5,325,933 A | 7/1994 | Matsushita | |
| 5,346,175 A | 9/1994 | Hunnicutt | |
| 5,590,041 A | 12/1996 | Cooper | |
| 5,762,475 A | 6/1998 | Maddock et al. | |
| 5,787,374 A | 7/1998 | Ferguson et al. | |
| 5,904,222 A | 5/1999 | Liubakka et al. | |
| 6,119,061 A | 9/2000 | Schenkel et al. | |
| 6,167,334 A | 12/2000 | Liubakka et al. | |
| 6,170,584 B1 | 1/2001 | Mistry et al. | |
| 6,173,223 B1 | 1/2001 | Liubakka et al. | |
| 6,240,351 B1 | 5/2001 | Hou et al. | |
| 6,256,893 B1 | 7/2001 | Förborgen | |

* cited by examiner

*Primary Examiner*—Anne Marie Boehler
(74) *Attorney, Agent, or Firm*—Finnegan, Henderson, Farabow, Garrett & Dunner

(57) ABSTRACT

A system and method of calibrating a differential steering system in a vehicle is provided. An initiation signal is received. At least one operating condition of the vehicle is monitored. A variable activation signal is applied to an actuation device operable to initiate a flow of pressurized fluid to a steering motor when the at least one operating condition is within a predetermined range. The rotation of the steering motor is monitored. A data point indicative of the value of the variable activation signal applied to the actuation device is captured when the steering motor begins to rotate in response to energization of the actuation device.

20 Claims, 3 Drawing Sheets

SYSTEM AND METHOD FOR CALIBRATING A DIFFERENTIAL STEERING SYSTEM

TECHNICAL FIELD

The present invention is directed to a system and method for calibrating a differential steering system. More particularly, the present invention is directed to a system and method for calibrating a hydraulically driven differential steering system.

BACKGROUND

Differential steering systems are commonly used in many types of vehicles, including, for example, those vehicles designed for agricultural and construction related activities. Each of these vehicles typically includes at least two ground engaging traction devices, which may be, for example, continuous belts, tracks, or tires. The ground engaging traction devices are disposed on opposites sides of the vehicle and may be rotated to propel the vehicle along a chosen path.

A differential steering system guides the vehicle along a chosen path by changing the relative velocity of the ground engaging traction devices. For example, to turn the vehicle to the left, the left ground engaging traction device is rotated at a slower velocity than the right ground engaging traction device. To turn the vehicle to the right, the right ground engaging traction device is rotated at a slower velocity than the left ground engaging traction device. The relative difference in velocities causes the vehicle to turn in the direction of the slower ground engaging traction device. The rate of turn, or turning radius, may be adjusted by increasing or decreasing the magnitude of difference in velocities between the ground engaging traction devices. Increasing the magnitude of difference in velocities results in a tighter turn, or a decreased turning radius. Decreasing the magnitude of difference in velocities results in a wider turn, or an increased turning radius.

Some differential steering systems include a hydraulic system that has a pump and a fluid motor. The pump drives the fluid motor to rotate a shaft in one of two directions. Rotation of the shaft in one direction causes one ground engaging traction device to rotate at a higher velocity than the other ground engaging traction device. Rotation of the shaft in the second direction causes the other ground engaging traction device to rotate at a higher velocity. The rotational velocity of the shaft dictates the magnitude of the velocity difference between the ground engaging traction devices.

These hydraulically driven differential steering systems may include a series of electrical, mechanical, and hydraulic components that work together to rotate the output shaft at a desired speed and direction. These components are, however, subject to manufacturing differences and not all components will behave in an identical manner. Accordingly, once a particular differential system is assembled, the system may need to be calibrated to account for performance differences in the components. In addition, the system may need to be calibrated after undergoing maintenance or repair and after the vehicle has been operated for a given number of hours.

The calibration procedure typically produces a calibration map or calibration function for the particular steering system that may be stored in the memory of a control system. The calibration map is a set of data points that account for any operating discrepancies in the system components. These data points may be used by the control system to scale a command signal sent to the steering system to compensate for factors such as manufacturing differences in the system components. The scaling of the command signal helps ensure that the output of the steering system matches the desired output so that the desired turning radius is achieved. One exemplary system for calibrating a hydraulic control and determining a set of calibration data points is described in U.S. Pat. No. 5,762,475.

Typically, the calibration procedure for a differential steering system involves connecting an external control to the vehicle and operating the vehicle through a series of test conditions. The external control monitors the operation of the steering system as the vehicle performs the test conditions and develops the data points necessary to create the calibration map. The calibration map may then be stored in the control system for use during standard operation of the vehicle.

This type of calibration procedure, however, can be time consuming and inconvenient. As an external control may need to be connected to the vehicle, a skilled technician may be required to perform the calibration procedure. This will require that the vehicle has to be transported to a maintenance facility or that the skilled technician visit the vehicle. This may result in down time for the vehicle as it waits for the calibration to be performed. Once the external control is connected, the external control may need to be monitored while the vehicle is operated. This may require that two people be present on the vehicle during the calibration process, one to operate the vehicle and one to monitor the external control.

The calibration system and method of the present invention solves one or more of the problems set forth above.

SUMMARY OF THE INVENTION

One aspect of the present invention is directed to a method of calibrating a differential steering system in a vehicle. An initiation signal is received. At least one operating condition of the vehicle is monitored. A variable activation signal is applied to an actuation device operable to initiate a flow of pressurized fluid to a steering motor when the at least one operating condition is within a predetermined range. The rotation of the steering motor is monitored. A data point indicative of the value of the variable activation signal applied to the actuation device is captured when the steering motor begins to rotate in response to energization of the actuation device.

In another aspect, the present invention is directed to a differential steering system. The differential steering system includes a source of pressurized fluid operable to selectively generate a first flow of pressurized fluid in a first direction and a second flow of pressurized fluid in a second direction. A steering motor is in fluid connection with the source of pressurized fluid and is configured to rotate a shaft in one direction when the flow of pressurized fluid is in the first direction and to rotate the shaft in an opposite direction when the flow of pressurized fluid is in the second direction. An actuation device is connected to the source of pressurized fluid and is configured to selectively initiate the first flow of pressurized fluid in the first direction and the second flow of pressurized fluid in the second direction. A control is configured to apply a variable activation signal to the actuation device to initiate one of the first and second flows of pressurized fluid and to capture a data point indicative of the current at which the steering motor begins to rotate the shaft.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
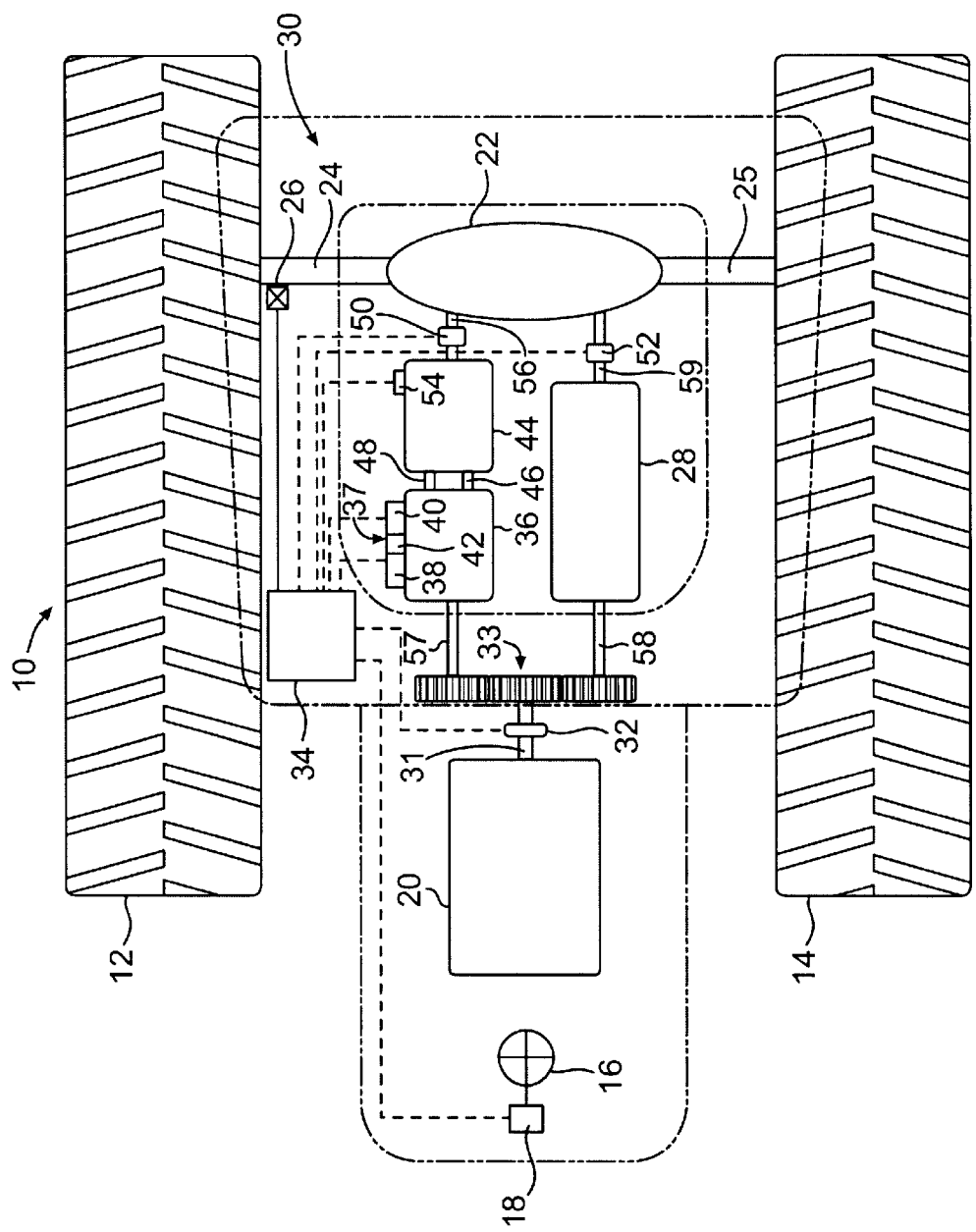
FIG. 1 is a diagrammatic illustration of a vehicle including a differential steering system in accordance with an exemplary embodiment of the present invention.

As diagrammatically illustrated in FIG. 1, a differential steering system 30 for a vehicle 10 is provided. Vehicle 10 may be any type of wheeled or tracked vehicle that typically utilizes a differential steering system to guide the vehicle. For example, vehicle 10 may be an agricultural machine or a construction machine.

Vehicle 10 includes a first ground engaging traction device 12 and a second ground engaging traction device 14. First and second ground engaging traction devices 12, 14 may be any type of device commonly used on a wheeled or tracked machine. For example, first and second ground engaging traction devices 12, 14 may be continuous belts, tracks, or wheels.

First and second ground engaging traction devices 12, 14 are driven by a first axle 24 and a second axle 25. Rotation of first axle 24 causes a corresponding rotation of first ground engaging traction device 12 and rotation of second axle 25 causes a corresponding rotation of second ground engaging traction device 14. A rotation of one or both of first and second axles 24, 25 will propel vehicle 10.

As also illustrated in FIG. 1, vehicle 10 includes an engine 20 that drives first and second axles 24, 25 to propel vehicle 10. Engine 20 may be any type of power source capable of generating a rotational torque. For example, engine 20 may be a diesel engine that rotates an engine shaft 31.

The rotational torque exerted on engine shaft 31 is transmitted to first and second axles 24, 25 through a transmission 28 and a differential 22. Engine shaft 31 is connected to a transmission input shaft 58 through a gear assembly 33. Gear assembly 33 translates the rotation of engine shaft 31 into a corresponding rotation of transmission input shaft 58.

Transmission 28 includes a series of gears that provide a range of gear ratios for the vehicle. Engagement of a particular gear ratio connects the transmission input shaft 58 with a transmission output shaft 59. The selected gear ratio translates the rotation of transmission input shaft 58 into a corresponding rotation of transmission output shaft 59. The speed of rotation of transmission output shaft 59 depends upon the selected gear ratio. An operator may utilize transmission 28 to select a particular gear ratio depending upon the desired speed of vehicle 10.

Transmission output shaft 59 provides an input rotation to differential 22. Differential 22 converts the rotational speed of transmission output shaft 59 into corresponding rotations of first axle 24 and second axle 25. Differential 22 may include a gearing arrangement that allows first axle 24 to be rotated at a different speed than second axle 25.

Vehicle 10 may include a series of sensors disposed within vehicle 10 to provide information on the current operating conditions of vehicle 10. For example, an engine speed sensor 32 may be disposed on engine shaft 31 to provide operating information about engine 20. In addition, a ground speed sensor 26 may be connected to first axle 24 to provide information regarding the speed at which vehicle 10 is traveling. Also, a transmission speed sensor 52 may be disposed on transmission output shaft 59 to provide information on the operating speed of transmission 28. Any additional or alternative sensors readily apparent to one skilled in the art as capable of providing information regarding these or other operating conditions of vehicle 10 may also be included.

As illustrated in FIG. 1, engine 20 is also connected to a source of pressurized fluid 36 through gear assembly 33 and pump shaft 57. Gear assembly 33 translates the rotation of engine shaft 31 into a corresponding rotation of pump shaft 57, which drives source of pressurized fluid 36. Source of pressurized fluid 36 may be any device capable of selectively providing a first flow of pressurized fluid into first fluid line 46 and a second flow of pressurized fluid into second fluid line 48.

Source of pressurized fluid 36 may be, for example, a variable capacity pump having a controlling swash plate 42 that governs the direction of flow of pressurized fluid. For example, movement of swash plate 42 in a first direction may initiate the first flow of pressurized fluid through first fluid line 46. Movement of swash plate 42 in a second direction may initiate a second flow of pressurized fluid through second fluid line 48.

Swash plate 42 may also govern the flow rate of the pressurized fluid. For example, the amount of movement of swash plate 42 may correspond to the magnitude of the produced fluid flow. For example, a small movement of swash plate 42 may result in a relatively small flow of pressurized fluid, whereas a large movement of swash plate 42 may result in a relatively large flow of pressurized fluid.

An actuation device 37 may be operatively engaged with source of pressurized fluid 36 to control the rate and direction of fluid flow from source of pressurized fluid 36. Actuation device 37 may include, for example, a first solenoid 38 and a second solenoid 40 that are operatively engaged with swash plate 42. In response to an energizing current, or another actuating signal, first solenoid 38 may move swash plate 42 in the first direction to initiate the first flow of pressurized fluid through first fluid line 46. Similarly, second solenoid 40, in response to an energizing current, or other actuating signal, may move swash plate 42 in the second direction to initiate the second flow of pressurized fluid through second fluid line 48.

As illustrated in FIG. 1, differential steering system 30 also includes a steering motor 44. Steering motor 44 may be any type of fluid motor configured to rotate a shaft 56 in response to a flow of pressurized fluid. Steering motor 44 may be further configured to rotate shaft 56 in opposite directions, based on the direction of the incoming pressurized fluid flow. For example, steering motor 44 may be configured to rotate shaft 56 in one direction when source of pressurized fluid 36 generates the first flow of pressurized fluid in the first direction and to rotate shaft 56 in the opposite direction when source of pressurized fluid 36 generates the second flow of pressurized fluid in the second direction.

First and second fluid lines 46, 48 may also serve as fluid return lines. For example, when source of pressurized fluid 36 provides the first flow of pressurized fluid through first fluid line 46, steering motor 44 may return fluid to source of pressurized fluid 36 through second fluid line 48. Similarly, when source of pressurized fluid 36 provides the second flow of pressurized fluid through second fluid line 48, steering motor 44 may return fluid to source of pressurized fluid 36 through first fluid line 46.

Additional sensors may be disposed in differential steering system 30 to provide information regarding the operating conditions of the system. For example, a sensor 50 may be disposed on shaft 56 to indicate the rotational speed of shaft 56. Sensor 50 may be any device recognized by one skilled in the art as capable of providing an indication of when shaft 56 begins to rotate, as well as an indication of the rotational speed of shaft 56. In addition, a temperature sensor 54 may be provided to sense the temperature of the hydraulic fluid within differential steering system 30.

As illustrated in FIG. 1, shaft 56 provides a second input to differential 22. Shaft 56 is connected to differential 22 through a gearing assembly that changes the relative rotational speed of first axle 24 and second axle 25 based on the direction and magnitude of the rotation of shaft 56. For example, when shaft 56 rotates in one direction, the gearing assembly modifies differential 22 so that first axle 24 rotates faster than second axle 25. When shaft 56 rotates in the opposite direction, the gearing assembly modifies differential 22 so that second axle 25 rotates faster than first axle 24. When shaft 56 is not rotating, first axle 24 and second axle 25 rotate at substantially the same speed. Thus, by varying the relative rotational speeds of first axle 24 and second axle 25, the rotational speeds of first and second ground engaging traction devices 12, 14 may also be varied. In this manner, vehicle 10 may be guided along a chosen path.

As illustrated in FIG. 1, a control 34 is provided to control differential steering system 30. Control 34 may include a computer, which has all components required to run an application, such as, for example, a memory, a secondary storage device, a processor, such as a central processing unit, and an input device. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

Control 34 may be configured to receive information from each of the operating condition sensors on vehicle 10. Control 34 may be connected to, for example, the engine speed sensor 32 to receive engine speed information, to the ground speed sensor 26 to receive vehicle speed information, to the transmission speed sensor 52 to receive transmission speed information, to the steering shaft speed sensor 50 to receive steering information, and to the temperature sensor 54 to receive information on the temperature of the hydraulic fluid.

As further illustrated in FIG. 1, vehicle 10 includes a steering mechanism 16, which may be, for example, a steering wheel. An operator may turn steering mechanism 16 to turn vehicle 10. A steering position sensor 18 may be connected to steering mechanism 16. Sensor 18 provides an indication of the current position of steering mechanism 16.

Control 34 is configured to receive the indication of the position of steering mechanism 16 from sensor 18. When control 34 determines that steering mechanism 16 has moved, i.e. the operator has initiated a turn or a change in the turn radius of vehicle 10, control 34 transmits an activation signal, such as, for example, a current, voltage, or pulse width modulation ("PWM") signal, to actuation device 37. For example, if control 34 determines that steering mechanism 16 has moved from a straight position towards the first direction, control 34 sends a signal, which may be a current, to first solenoid 38 of actuation device 37. The current energizes first solenoid 38, which engages and moves swash plate 42 in the first direction. Movement of swash plate 42 in the first direction initiates the first flow of pressurized fluid through first fluid line 46. The first flow of pressurized fluid causes steering motor 44 to rotate shaft 56. Rotation of shaft 56 results in one of the first and second axles 24 and 25 rotating faster than the other, thereby turning vehicle 10 in the desired direction.

The activation signal sent by control 34 to actuation device 37 is based, at least in part, on the operating parameters of source of pressurized fluid 36. To obtain a certain rate of turn for vehicle 10, a certain direction and rate of fluid flow may be directed to steering motor 44. The direction and rate of fluid flow is determined by the position of actuation device 37 and may vary between different differential steering systems.

Figure 2:
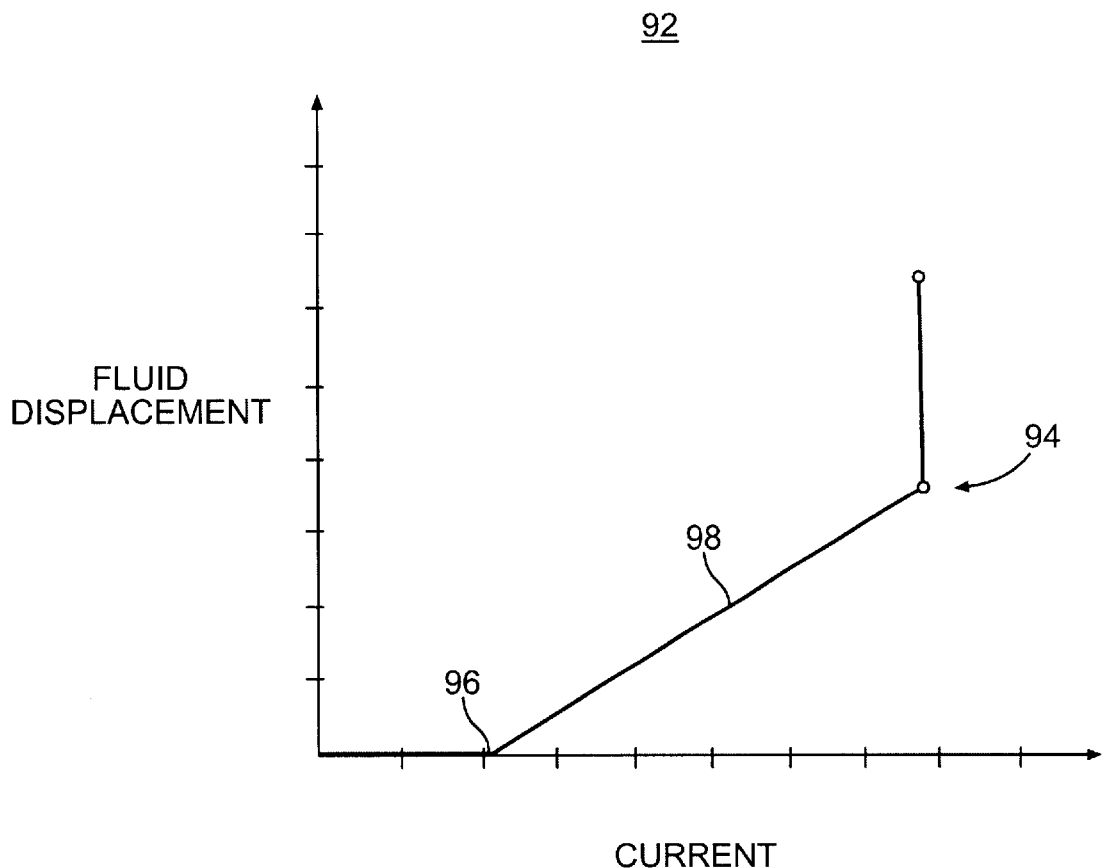
FIG. 2 is a graphic illustration of an exemplary calibration map for a differential steering system.

To determine the appropriate signal to transmit to actuation device 37, control 34 stores a "calibration map" in its memory. An exemplary calibration map 92 is illustrated in FIG. 2. Calibration map 92 plots the fluid displacement of the differential steering system 22 as a function of the current applied to actuation device 37. The result is a displacement function 94, from which control 34 can determine the appropriate current to apply to actuation device 37 to obtain a desired fluid flow rate and, thus, a desired turning radius. Typically, control 34 will store two calibration maps in memory, one for turning in the first direction and the second for turning in the second direction.

Displacement function 94 includes an initiation point 96 and a displacement slope 98. Initiation point 96 represents the value of the activation signal that may be applied to actuation device 37 to initiate rotation of shaft 56. Displacement slope 98 represents the increase in fluid displacement that may result from a given increase in the activation signal applied to actuation device 37. Displacement slope 98 is based primarily on the displacement characteristics of source of pressurized fluid 36.

Figure 3:
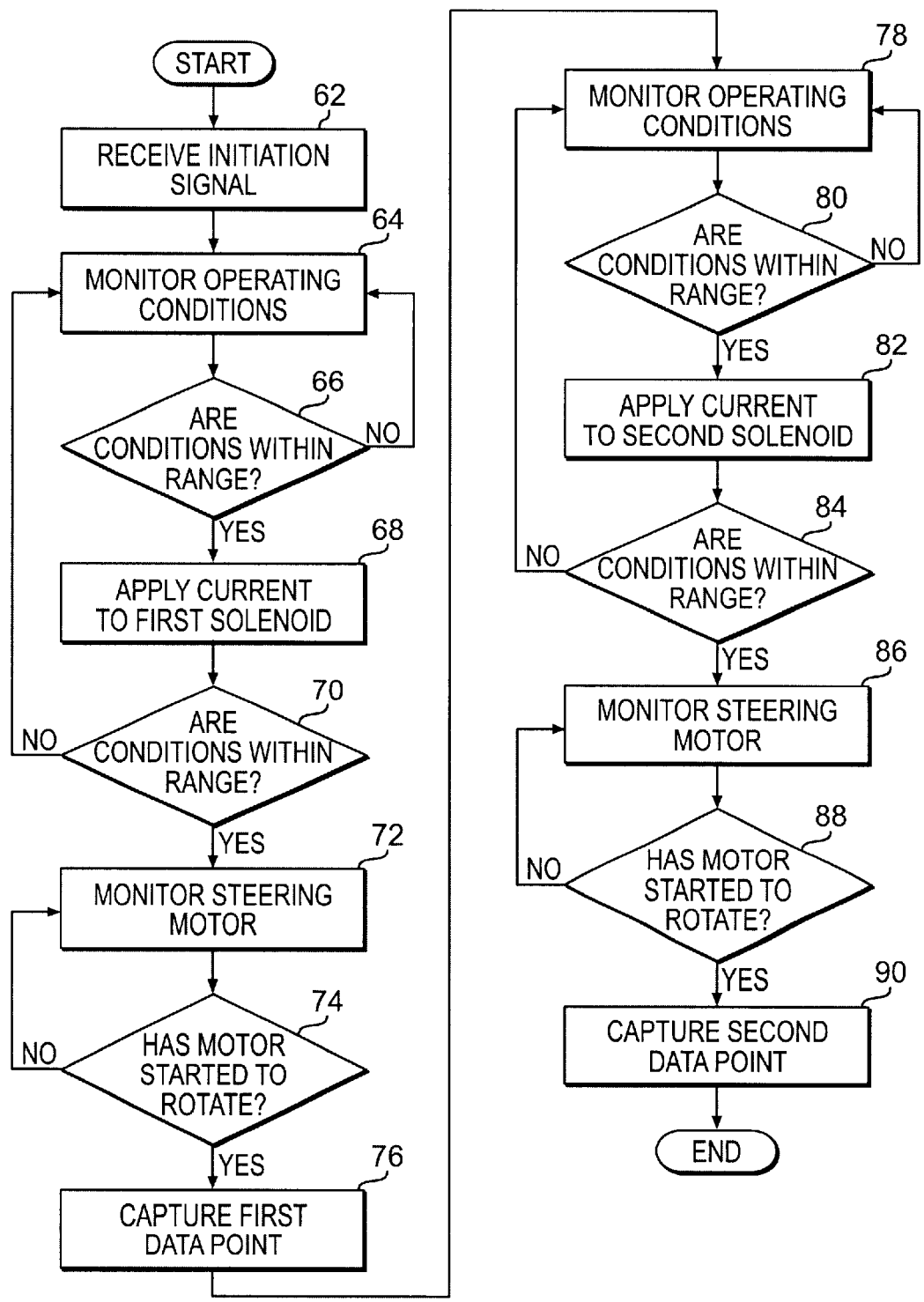
FIG. 3 is a flowchart illustrating a method of calibrating a differential steering system in accordance with an exemplary embodiment of the present invention.

FIG. 3 illustrates an exemplary method 60 of developing a calibration map for differential steering system 30. The calibration process is started when an initiation signal is received. (Step 62). An initiation signal may be generated when any of a number of conditions occur. For example, when control 34 determines that vehicle 10 has been operated for a certain number of hours since the last calibration, control 34 may generate an initiation signal. In addition, an initiation signal may be generated by an operator or technician on a new vehicle or on a vehicle that has recently undergone service or repair.

After the initiation signal is received, control 34 will monitor the operating conditions of vehicle 10 to determine an appropriate calibration period. (Step 64). For example, control 34 may monitor the position of steering mechanism 16 through steering position sensor 18, the engine speed through engine speed sensor 32, the ground speed of vehicle 10 through ground speed sensor 26, steering motor speed through sensor 50, and the temperature of the hydraulic fluid through temperature sensor 54.

Control 34 will determine if one or all of the monitored operating conditions are within a predetermined range. (Step 66). For example, for an appropriate calibration, steering mechanism 16 may have to be in the straight position and steering motor 44 may have to be stopped. In addition, the engine speed, the ground speed, and the hydraulic fluid temperature may have to be within certain limits. Other operating conditions may also be monitored to identify an appropriate calibration period.

If the monitored operating conditions are within the predetermined ranges, control 34 continues with the calibration procedure. Control 34 applies a variable actuation signal, such as an increasing current, to first solenoid 38 of actuation device 37. (Step 68). The increasing current to first solenoid 38 causes swash plate 42 to move and initiate the first flow of fluid through first fluid line 46. When the first flow of fluid becomes great enough, steering motor 44 will begin to rotate shaft 56.

Control 34 continues to monitor the operating conditions of vehicle 10. If one or more of the monitored operating conditions deviates from the predetermined limits (step 70), such as if the operator moves steering mechanism 16 to turn vehicle 10, control 34 may abort the calibration procedure. Control 34 may then generate an initiation signal to restart the calibration process when the monitored operating conditions return to within their acceptable ranges.

If the operating conditions remain within the predetermined limits, control 34 monitors the rotation of shaft 56 of steering motor 44. (Step 72). When control 34 receives an indication from sensor 50 that shaft 56 has started to rotate (step 74), control 34 captures a first data point that indicates the value of the activation signal, such as the magnitude of the current, that is being applied to first solenoid 38 (step 76). The first data point is stored in the memory of control 34 as the initiation point 96 for the calibration map for a turn in the first direction.

Control 34 continues to monitor the operating conditions of vehicle 10. (Step 78). If the monitored operating conditions remain within the predetermined limits (step 80), control 34 applies a similar variable activation signal to second solenoid 40 (step 82). If the monitored operating conditions do not deviate outside of the predetermined limits (step 84), control 34 will monitor shaft 56 to determine when steering motor 44 starts to rotate in the opposite direction. (Step 86). When control 34 receives an indication that shaft 56 has started to rotate (step 88), control 34 captures a second data point that indicates the value of the variable activation signal that is being applied to second solenoid 40. (Step 90). The second data point is stored in the memory of control 34 as the initiation point 96 for the calibration map for a turn in the second direction.

To complete the calibration maps for differential steering system 30, control 34 may determine the displacement slope 98 portion of displacement function 94. This may be accomplished, for example, by continuing to apply the variable activation signal to actuation device 37. As the current is increased, the fluid flow rate provided by source of pressurized fluid 36 will increase. Control 34 may create the displacement slope 98 for each calibration map by capturing additional data points that represent the flow rate of fluid supplied by source of pressurized fluid 36 as a function of the value of the activation signal applied to each of the first and second solenoids 38 and 40.

It has been found, however, that there is relatively little discrepancy in the displacement characteristics between two similar sources of pressurized fluid 36. In other words, the displacement slope 98 will be substantially equivalent for similar types, or models, of sources of pressurized fluid 36. Thus, displacement slope 98 for two different differential steering systems that use the same type of pump will be nearly identical. Accordingly, control 34 may also complete calibration map 92 by using displacement information supplied by a manufacturer for a given source of pressurized fluid 36 to determine displacement slope 98. Displacement slope 98 may be updated or modified if a new type or model of source of pressurized fluid 36 is added to differential steering system 30.

Differential steering system 30 may include a feedback loop that accounts for any differences in actual pump performance. The feedback loop compares the actual magnitude and direction of the rotation of shaft 56 as sensed by sensor 50 with the expected magnitude and direction of rotation of shaft 56. If control 34 determines that the actual rotation differs from the expected rotation, the signal sent to actuation device 37 may be adjusted accordingly.

Industrial Applicability

As will be apparent from the foregoing description, the present invention provides a calibration method for a differential steering system that may be performed during ordinary operation of the vehicle. The calibration method of the present may be automatically scheduled and initiated when, for example, the vehicle has been operated for a certain number of hours or after the vehicle has been maintained. Once scheduled, the calibration process will start when the operating conditions are optimal for obtaining accurate data points. The calibration process will abort if a change in the operating conditions may impact the accuracy of the data points. Thus, no external tools are required to initiate or perform the calibration process and the entire calibration process may be completely transparent to the operator.

Thus, the present invention provides a system and method for calibrating a differential steering system that is convenient and inexpensive. The described calibration system and method may be applied to any vehicle that utilizes a differential steering system. In addition, the described calibration system may be implemented into an existing vehicle without major modifications to the existing hardware.

It will be apparent to those skilled in the art that various modifications and variations can be made in the calibration system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of calibrating a differential steering system in a vehicle, comprising:

receiving an initiation signal;

monitoring at least one operating condition of the vehicle;

applying a variable actuation signal to an actuation device operable to initiate a flow of pressurized fluid to a steering motor when the at least one operating condition is within a predetermined range;

monitoring the rotation of the steering motor;

capturing a data point indicative of the value of the activation signal applied to the actuation device when the steering motor begins to rotate in response to energization of the actuation device; and updating a calibration map with the captured data point.

2. The method of claim 1, further including the step of generating the initiation signal when the vehicle has been operated for a predetermined number of hours.

3. The method of claim 1, further including the step of generating the initiation signal upon a command from an operator.

4. The method of claim 1, wherein the at least one operating condition monitored is selected from a group of operating conditions including a position of a steering mechanism, a speed of an engine, a ground speed of the vehicle, and a temperature of a hydraulic fluid.

5. The method of claim 4, further including the step of aborting the calibration procedure when the at least one operating condition is outside of the predetermined range.

6. The method of claim 5, further including the step of generating an initiation signal to restart the calibration procedure when the at least one operating condition returns to within the predetermined range.

7. The method of claim 1, wherein the actuation device includes a first solenoid and a second solenoid and an increasing current is sequentially applied to each of the first and second solenoids, and a first data point is captured when the steering motor begins to rotate in response to energization of the first solenoid and a second data point is captured when the steering motor begins to rotate in response to energization of the second solenoid.

8. The method of claim 1, further including the steps of:
capturing additional data points indicative of the flow rate of pressurized fluid to the steering motor as a function of the value of the variable activation signal applied to the actuation device; and
updating the calibration map with the additional data points.

9. A differential steering system, comprising:
a source of pressurized fluid operable to selectively generate a first flow of pressurized fluid in a first direction and a second flow of pressurized fluid in a second direction;
a steering motor in fluid connection with the source of pressurized fluid and operable to rotate a shaft in one direction when the flow of pressurized fluid is in the first direction and to rotate the shaft in an opposite direction when the flow of pressurized fluid is in the second direction;
an actuation device connected to the source of pressurized fluid and configured to selectively initiate the first flow of pressurized fluid in the first direction and the second flow of pressurized fluid in the second direction; and
a control having a memory adapted to store a calibration map, the control configured to apply a variable activation signal to the actuation device to initiate one of the first and second flows of pressurized fluid to the steering motor, to capture a data point indicative of the value of the activation signal at which the steering motor begins to rotate the shaft, and to update the calibration map with the captured data point.

10. The differential steering system of claim 9, wherein the control is configured to sense at least one operating condition selected from a group of operating conditions including a steering mechanism position, an engine speed, and a hydraulic fluid temperature.

11. The differential steering system of claim 10, wherein the control is configured to apply the variable activation signal to the actuation device when the at least one operating condition is within a predetermined range.

12. The differential steering system of claim 9, wherein the actuation device includes a first solenoid configured to initiate the first flow of pressurized fluid in the first direction and a second solenoid configured to initiate the second flow of pressurized fluid in the second direction and the variable activation signal has an increasing current and is sequentially applied to each of the first and second solenoids.

13. A vehicle, comprising:
a first ground engaging traction device;
a second ground engaging traction device;
a differential having an input shaft, the differential operatively engaged with first and second ground engaging devices to rotate the first and second ground engaging devices at different velocities based on the rotation of the input shaft;
a source of pressurized fluid operable to selectively generate a flow of pressurized fluid in a first direction and in a second direction;
a steering motor in fluid connection with the source of pressurized fluid and operable to rotate the input shaft in one direction when the flow of pressurized fluid is in the first direction and to rotate the input shaft in an opposite direction when the flow of pressurized fluid is in the second direction;
an actuation device connected to the source of pressurized fluid and configured to selectively initiate the first flow of fluid in the first direction and the second flow of fluid in the second direction; and
a control having a memory adapted to store a calibration map, the control configured to apply a variable activation signal to the actuation device to initiate one of the first and second flows of pressurized fluid to the steering motor, to capture a data point indicative of the value of the variable activation signal at which the steering motor begins to rotate the shaft, and to update the calibration map with the captured data point.

14. The vehicle of claim 13, wherein the control is configured to sense at least one operating condition selected from a group of operating conditions including a steering mechanism position, an engine speed, and a hydraulic fluid temperature.

15. The vehicle of claim 14, further including a first sensor operable to sense when the steering motor begins to rotate the shaft, a second sensor operable to sense the position of the steering mechanism, a third sensor operable to sense the engine speed, a fourth sensor operable to sense the hydraulic fluid temperature.

16. The vehicle of claim 14, wherein the control is configured to apply the variable activation signal to the actuation device when the at least one operating condition is within a predetermined range.

17. The vehicle of claim 13, wherein the actuation device includes a first solenoid configured to initiate the first flow of pressurized fluid in the first direction and a second solenoid configured to initiate the second flow of pressurized fluid in the second direction and the variable activation signal has an increasing current and is sequentially applied to each of the first and second solenoids.

18. A differential steering system, comprising:
a source of pressurized fluid operable to selectively generate a flow of pressurized fluid in a first direction and in a second direction;
a steering motor in fluid connection with the source of pressurized fluid and operable to rotate a shaft in one direction when the flow of pressurized fluid is in the first direction and to rotate the shaft in an opposite direction when the flow of pressurized fluid is in the second direction;

a first solenoid operatively engaged with the source of pressurized fluid to cause the source of pressurized fluid to generate a flow of pressurized fluid in the first direction when the first solenoid is energized;

a second solenoid operatively engaged with the source of pressurized fluid to cause the source of pressurized fluid to generate a flow of pressurized fluid in the second direction when the second solenoid is energized; and a control having a memory adapted to store a first calibration map and a second calibration map, the control operable to apply an increasing current to the first solenoid to generate the flow of fluid in the first direction to the steering motor, to capture a first data point indicative of the current at which the steering motor begins to rotate the shaft in the one direction, and to update the first calibration map with the captured data point, the control further operable to apply an increasing current to the second solenoid to initiate the flow of fluid in the second direction to the steering motor, to capture a second data point indicative of the current at which the steering motor begins to rotate the shaft in the other direction, and to update the second calibration map with the captured data point.

19. The differential steering system of claim 18, further including a first sensor operable to sense when the steering motor begins to rotate the shaft, a second sensor operable to sense the position of the steering mechanism, a third sensor operable to sense the engine speed, and a fourth sensor operable to sense the hydraulic fluid temperature.

20. The differential steering system of claim 19, wherein the control is configured to apply the current to the first and second solenoids when the at least one operating condition is within a predetermined range.

* * * * *